(12) United States Patent
Simuttis et al.

(10) Patent No.: US 6,435,488 B1
(45) Date of Patent: Aug. 20, 2002

(54) SWITCHABLE, HYDRAULICALLY DAMPING BEARING

(75) Inventors: Arnold Simuttis, Bad Kreuznach; Werner Hettler, Mannheim, both of (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/723,160

(22) Filed: Nov. 27, 2000

(51) Int. Cl.$^7$ .............................. F16F 13/26; F16F 15/02

(52) U.S. Cl. ................. 267/140.15; 267/140.14

(58) Field of Search ................. 267/140.14, 140.15

(56) References Cited

U.S. PATENT DOCUMENTS

| | | | | |
|---|---|---|---|---|
| 4,828,234 A | * | 5/1989 | Hoying et al. | 267/140.14 |
| 4,886,251 A | * | 12/1989 | Haussermann | 267/140.14 |
| 4,901,986 A | * | 2/1990 | Smith | 267/140.14 |
| 5,145,156 A | * | 9/1992 | Muramatsu et al. | 267/140.14 |

FOREIGN PATENT DOCUMENTS

DE 42 38 752 5/1994

* cited by examiner

Primary Examiner—Matthew C. Graham
(74) Attorney, Agent, or Firm—Kenyon & Kenyon

(57) ABSTRACT

A switchable, hydraulically damping bearing has a supporting bearing and a bearing member that are elastically supported upon one another by a bearing spring made of an elastomeric material. The bearing has a working chamber and a compensating chamber that are arranged consecutively in the direction of vibrations. The chambers are filled with damping fluid. The working chamber and the compensating chamber are delimited by a shared partition on the sides facing each other. The chambers are connected in a fluid-conducting manner by at least one damping conduit provided in the partition. The working chamber is delimited by at least one elastic diaphragm that delimits an air chamber on the side facing away from the working chamber. The air chamber is connected to the environment by a switchable intake valve or a non-return valve, depending on the operating state of a supported engine. The air chamber can be filled with air flowing through the non-return valve when the intake valve is closed and the bearing executes pulling movements, thereby increasing bearing rigidity.

15 Claims, 2 Drawing Sheets

SWITCHABLE, HYDRAULICALLY DAMPING BEARING

FIELD OF INVENTION

The present invention relates generally to bearings, and more particularly to a switchable, hydraulically damping bearing.

BACKGROUND OF THE INVENTION

A switchable, hydraulically damping bearing is known from German Patent 42 38 752 C1. The pulling and compressing movements of the bearing empties an air chamber via a non-return valve to increase the bearing's spring stiffness. The use of the non-return valve makes it possible to discharge air from the air chamber without any outside assistance. Air intake into the air chamber is accomplished by opening an intake valve, connecting the air chamber to the atmosphere. The diaphragm then returns to its original position.

SUMMARY OF THE INVENTION

The object of the present invention is to further develop a switchable, hydraulically damping bearing of the type described above so that it has a high spring stiffness and good damping properties as needed, while maintaining very small dimensions and a low mounting height.

This object is achieved according to the present invention by a supporting bearing and a bearing member. A bearing spring made of an elastomeric material elastically connects the supporting bearing and the bearing member. A working chamber and a compensating chamber are formed by the supporting bearing and the bearing member. The chambers are arranged consecutively in the direction of the vibrations. Both chambers are filled with damping fluid, and a partition separates the chambers on the sides facing each other. A damping conduit is provided in the partition to allow fluid communication between the chambers. At least a portion of the working chamber is delimited by an elastic diaphragm that also delimits an air chamber on the side facing away from the working chamber. The air chamber is connected to the environment by a switchable intake valve or a non-return valve, depending on the operating state of a supported engine. The air chamber can be filled with air flowing through the non-return valve when the intake valve is closed and the bearing executes pulling movements, thereby increasing bearing rigidity.

According to one embodiment, the supporting bearing can have a core and a core plate that is adhesively connected to the bearing spring. The core plate is sealingly connected in a positive-locking manner to the core. The advantage of this arrangement is that the multi-part supporting bearing can be easily adapted to a variety of bearing types. For example, it is possible to connect cores of different designs to the same core plate, requiring only the joining areas of the cores to have the same design. In addition to cores having different designs, the cores can also be made of different materials adapted to the application at hand.

The air chamber is preferably formed by the diaphragm, core, and core plate. The diaphragm preferably extends at right angles to the direction of the initiated vibrations and is sealingly connected to a flange of the core plate extending in the axial direction. A diaphragm that extends at right angles to the direction of the initiated vibrations has the advantage (compared to diaphragms that extend in the direction of the initiated vibrations) that it can tolerate a direct load without reversing the flow and thus without any losses. Integrating the arrangement into the core requires practically no additional mounting height, making it possible to give the bearing a compact design. A geometric delimitation from the nozzle diaphragm system is also advantageous for adjusting the function.

The bearing spring and the diaphragm are preferably made of the same material and are designed as one continuous piece. Both the bearing spring and the diaphragm are preferably vulcanized along with the core plate in a single step to ensure economical and simple production. If especially soft diaphragms are required, however, a separate diaphragm is more practical. Separate diaphragms are also more practical with larger diameters.

The intake valve can be operated by electromagnetic means. Different operating methods, such as pneumatic or hydraulic operation, are possible. Electromagnetic operation of the intake valve is especially well suited to applications in engine bearings, due to their switching precision.

The intake valve is preferably connected to the engine management system of an internal combustion engine and connects the air chamber to the environment while the internal combustion engine is idling or is closed at nonidling speeds.

The operation of the bearing according to the present invention will now be described. The bearing is preferably used as an engine bearing to support an internal combustion engine. While the internal combustion engine is idling, the intake valve is open so that the pressure in the air chamber equals the atmospheric pressure. In this mode of operation, the bearing's spring stiffness is comparatively low to insulate or eliminate idling vibrations.

At speeds above idling speed, i.e., during vehicle operation, the valve is closed. The air chamber is thus hermetically sealed against the environment. During vehicle operation, the damping fluid is transferred back and forth between the working and compensating chambers through a damping conduit. This damps high-amplitude, low-frequency vibrations. In this operating mode, the diaphragm limiting the air chamber undergoes very little deformation, since the air chamber is closed and the air it contains alternately compresses and expands during vibration damping. At high vibration amplitudes the bearing is subjected to large pulling movements. This results in a rebounding movement which produces a partial vacuum in the working chamber. This partial vacuum expands the diaphragm in the direction of the working chamber, increasing the volume in the air chamber. Because the intake valve is closed, the only way to equalize the partial vacuum in the air chamber is for the air to flow from the environment into the air chamber through the non-return valve. When the bearing reverses its load from a pulling movement to a compression movement, the non-return valve closes automatically. The air mass previously entering the air chamber during the pulling movement is thus trapped in the air chamber. The higher pressure in the air chamber therefore produces a higher bearing rigidity. The higher bearing rigidity improves the damping action of the bearing.

The valve and the non-return valve preferably form a single preassembled unit. This simplifies mounting the unit onto the bearing and minimizes the danger of mounting errors.

The core can be designed with a largely circular shape, with the unit being connected to the core. For example, it is possible to arrange the unit in a central recess in the core and screw it onto the core. The connection between the air chamber and the atmosphere, either via the intake valve or via the non-return valve, is formed by a hollow cylindrical core screw or a hollow cylindrical stay bolt. Components of this type allow the unit, composed of the valve and non-return valve, to be attached to the supporting bearing, and also form a connecting line for the air between the environment and the air chamber.

The core and/or the unit can have at least one stop pad. The stop pad limits extreme movements at the diaphragm during bearing compression movements. At high-amplitude, low-frequency vibrations, for example, pressure peaks occur within the working chamber. The stop pad also avoids exposing the diaphragm, which is much thinner than the bearing spring, to unwanted high mechanical loads during bearing compression movements. This gives the bearing uniformly good service characteristics during a long service life.

The diaphragm can have surface texturing on the side facing the stop pad. The surface texturing can be formed, for example, by a random texture in the form of stop nubs to prevent noise when the diaphragm comes into contact with the stop pad.

The diaphragm can be subjected to elastic pretension so that it rests against a stop pad under elastic pretension when the bearing is subjected to a static preload. This gives the bearing better damping characteristics.

At least the bearing spring can be surrounded by a heat protection cover on its outer circumference. The heat protection cover is preferably held on the supporting bearing so that it remains stationary and prevents a connected internal combustion engine from radiating heat directly onto the bearing spring. It is also advantageous to protect the damping fluid located in the working and compensating chambers from unwanted exposure to high temperatures. This helps maintain good service characteristics.

DETAILED DESCRIPTION

Figure 1:
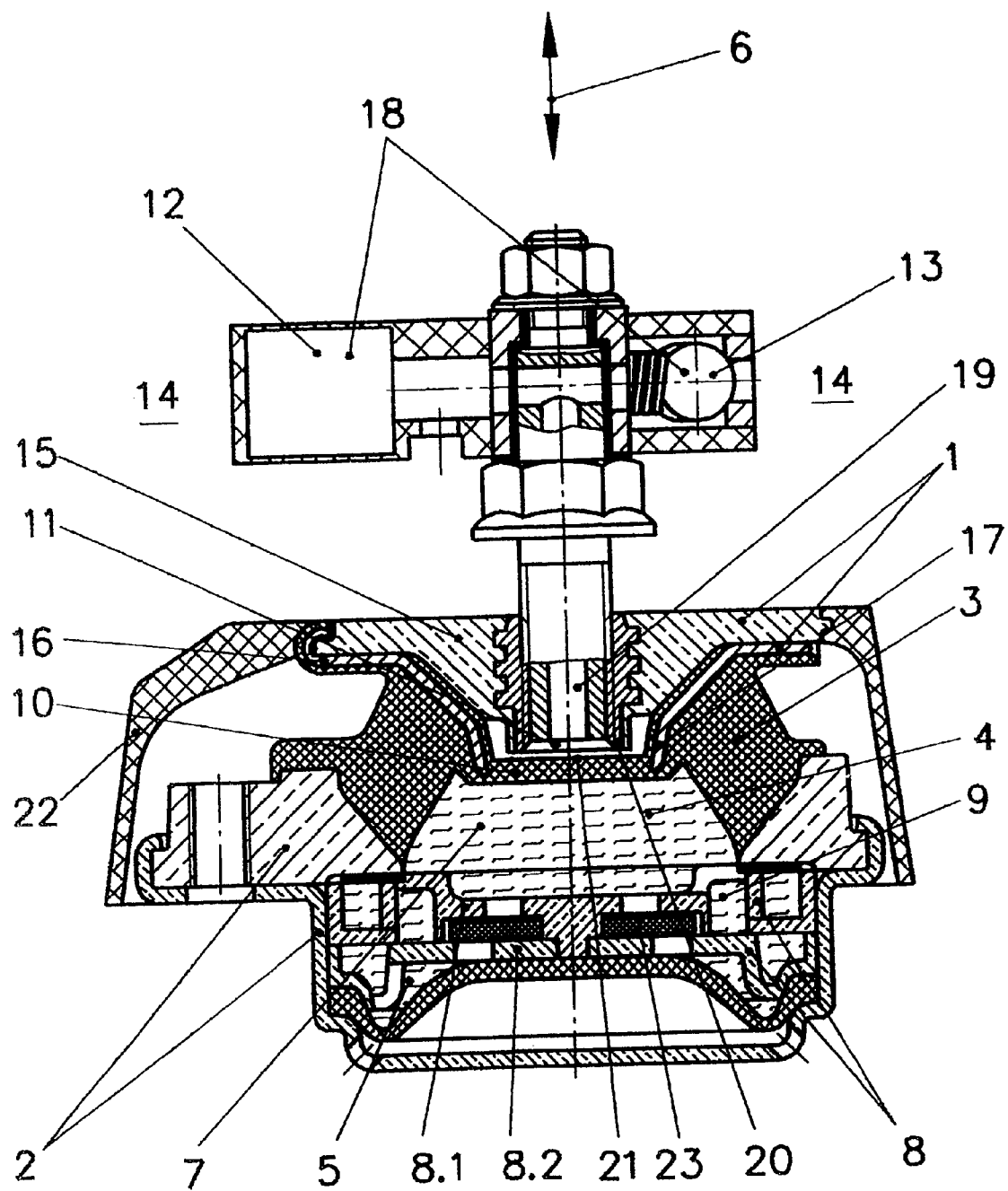
FIG. 1 shows a schematic diagram of one embodiment of a bearing according to the present invention.

FIG. 1 shows a schematic diagram of one embodiment of a bearing according to the present invention. The bearing is designed as a switchable, hydraulically damping bearing. It includes a supporting bearing 1 and a bearing member 2. The supporting bearing 1 and bearing number 2 are supported upon one another by a bearing spring 3. A working chamber 4 and a compensating chamber 5 are each filled with a damping fluid 7. The chambers are arranged consecutively in the direction 6 of the initiated vibrations. The working chamber 4 and the compensating chamber 5 are connected to one another by a damping conduit 9 located in a partition 8. The partition 8 in this embodiment has a two-part design. A decoupling diaphragm made of an elastomeric material for insulating high-frequency, low-amplitude vibrations is provided between both parts 8.1, 8.2 of partition 8.

On the side facing the supporting bearing 1, the working chamber 4 is bounded by a diaphragm 10 made of an elastomeric material. The diaphragm also delimits an air chamber 11. The air chamber 11 is connected to the environment 14 by an electromagnetically operated valve 12 and a non-return valve 13. A switching unit 18, composed of valve 12 and non-return valve 13, is screwed onto a core 15.

The core has a recess 19 that is located in the center in FIG. 1. A core plate 16 is sealingly connected in a positive-locking manner to the core 15, and adhesively connected to the bearing spring 3.

The air chamber 11 can be filled with air flowing thorough the non-return valve 13 when the valve 12 is closed. When the chamber is filled with air, the bearing executes a pulling movement, increasing bearing rigidity.

The operation of the bearing according to the present invention will now be described. The bearing illustrated is used as an engine bearing to support an internal combustion engine. While the internal combustion engine is idling, valve 12 is open so that the pressure in air chamber 11 equals the atmospheric pressure. In this mode of operation, the bearing's spring stiffness is comparatively low to insulate or eliminate idling vibrations.

At speeds above idling speed, i.e., during vehicle operation, the valve 12 is closed; the air chamber is hermetically sealed against the environment. The damping fluid 7 is transferred back and forth between the working chamber 4 and the compensating chamber 5 through the damping conduit 9 to damp high-amplitude, low-frequency vibrations. In this operating mode, the diaphragm 10 limiting the air chamber 11 undergoes very little deformation, since air chamber 11 is closed and the air it contains alternately compresses and expands during vibration damping. During compression movements of the bearing, the diaphragm 10 comes to rest with its surface texturing 21 against a stop pad 20. At high vibration amplitudes, the bearing is subjected to large pulling movements. This results in a rebounding movement which produces a partial vacuum in the working chamber 4. This partial vacuum expands the diaphragm 10 in the direction of the working chamber 4, increasing the volume in the air chamber 11. Because the valve 12 is closed, the only way to equalize the partial vacuum in the air chamber 11 is for the air to flow from the environment 14 into the air chamber 11 through the non-return valve 13. When the bearing reverses its load from a pulling movement to a compression movement, the non-return valve 13 closes automatically. The air mass previously entering the air chamber 11 during the pulling movement can therefore no longer escape from the air chamber 11. The higher pressure in the air chamber 11 therefore produces a higher bearing rigidity. The higher bearing rigidity improves the damping action.

In the embodiment illustrated in FIG. 1, the core 15 has a circular stop pad 20. The diaphragm can rest against the stop pad to limit extreme displacement movements during bearing compression movements. A heat protection cover 22 is connected to the supporting bearing 1. The cover remains stationary and covers bearing spring 3 and working chamber 4. This protects both the elastomeric material of the bearing spring 3 and the damping fluid 7 located in the working chamber 4 from unwanted exposure to high temperatures, produced, for example, by a supported internal combustion engine.

Figure 2:
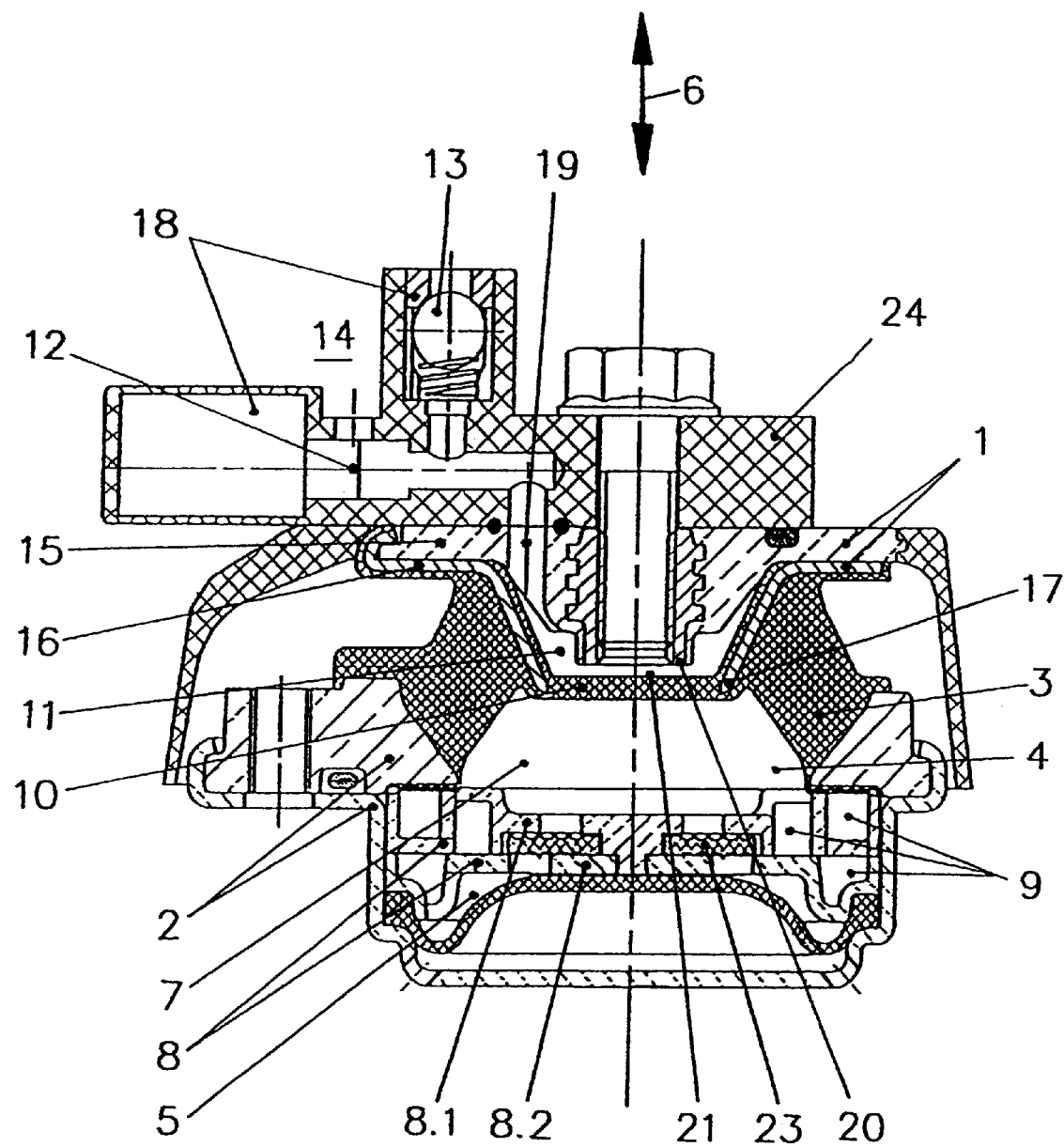
FIG. 2 shows a schematic diagram of another embodiment of a bearing according to the present invention.

FIG. 2 shows a second embodiment in which the air-conducting recess 19 is positioned on the side. This makes it possible to place the switching unit 18, including the switched valve 12 and the non-return valve 13, in a more radial direction. This reduces the overall mounting height. It is also helpful to make the retaining element 24—which is attached to the core 15 and is connected to either the engine or the vehicle body, depending on the amount of space available in the motor vehicle—part of the mechanism for conducting air into the air chamber 11.

What is claimed is:

1. A switchable, hydraulically damping bearing for damping vibrations comprising:

a supporting bearing;

a bearing member elastically connected to the supporting bearing by a bearing spring made of an elastomeric material, the supporting bearing and bearing member form a working chamber and a compensating chamber that are arranged consecutively in the direction of the vibrations, both chambers being filled with damping fluid;

a partition separating the working chamber and the compensating chamber, the partition having a damping conduit providing fluid connection between the working chamber and the compensating chamber;

at least one elastic diaphragm, one side of which delimits a portion of an air chamber, the other side of which delimits a portion of the working chamber;

a switchable intake valve connecting the air chamber to the environment; and a non-return valve connecting the air chamber to the environment, wherein the air chamber can be filled with air flowing through the non-return valve when the intake valve is closed and the bearing executes pulling movements, thereby increasing bearing rigidity.

2. The bearing according to claim 1, wherein the supporting bearing has a core and a core plate that is adhesively connected to the bearing spring, and the core plate is connected in a positive-locking manner to the core to form a seal.

3. The bearing according to claim 2, wherein the air chamber is delimited by the diaphragm, the core, and the core plate.

4. The bearing according to claim 2, wherein the diaphragm extends at right angles to the direction of the initiated vibrations and is connected to a flange of the core plate extending in the axial direction, forming a seal.

5. The bearing according to claim 1, wherein the bearing spring and the diaphragm are made of the same material and are designed as one continuous piece.

6. The bearing according to claim 1, wherein the intake valve can be operated by electromagnetic means.

7. The bearing according to claim 1, wherein the intake valve is connected to the engine management system of an internal combustion engine in a signal-conducting manner and connects the air chamber to the environment while the internal combustion engine is idling or is closed at non-idling speeds.

8. The bearing according to claim 1, wherein the intake valve and the non-return valve together form a preassembled unit.

9. The bearing according to claim 8, wherein the core has a largely circular shape and the preassembled unit is connected to the core.

10. The bearing according to claim 9, wherein the preassembled unit is arranged in a recess in the core and is screwed onto the core.

11. The bearing according to claims 8, wherein the core and/or the preassembled unit have at least one stop pad; and the diaphragm can come to rest against the stop pad to limit extreme displacement movements during bearing compression movements.

12. The bearing according to claim 11, wherein the diaphragm has surface texturing on the side facing the stop pad.

13. The bearing according to claim 1, wherein the diaphragm comes to rest against a stop pad under elastic pretension when the bearing is subjected to a static preload.

14. The bearing according to claims 1, wherein the bearing spring is surrounded by a heat protection cover on its outer circumference.

15. The bearing according to claim 14, wherein the heat protection cover is held on the supporting bearing so that it remains stationary.

* * * * *